May 5, 1931.   N. A. HALLWOOD   1,804,053
SCALE
Filed June 7, 1928   5 Sheets-Sheet 2

Inventor
N.A. Hallwood
By W.S. McDowell
Attorney

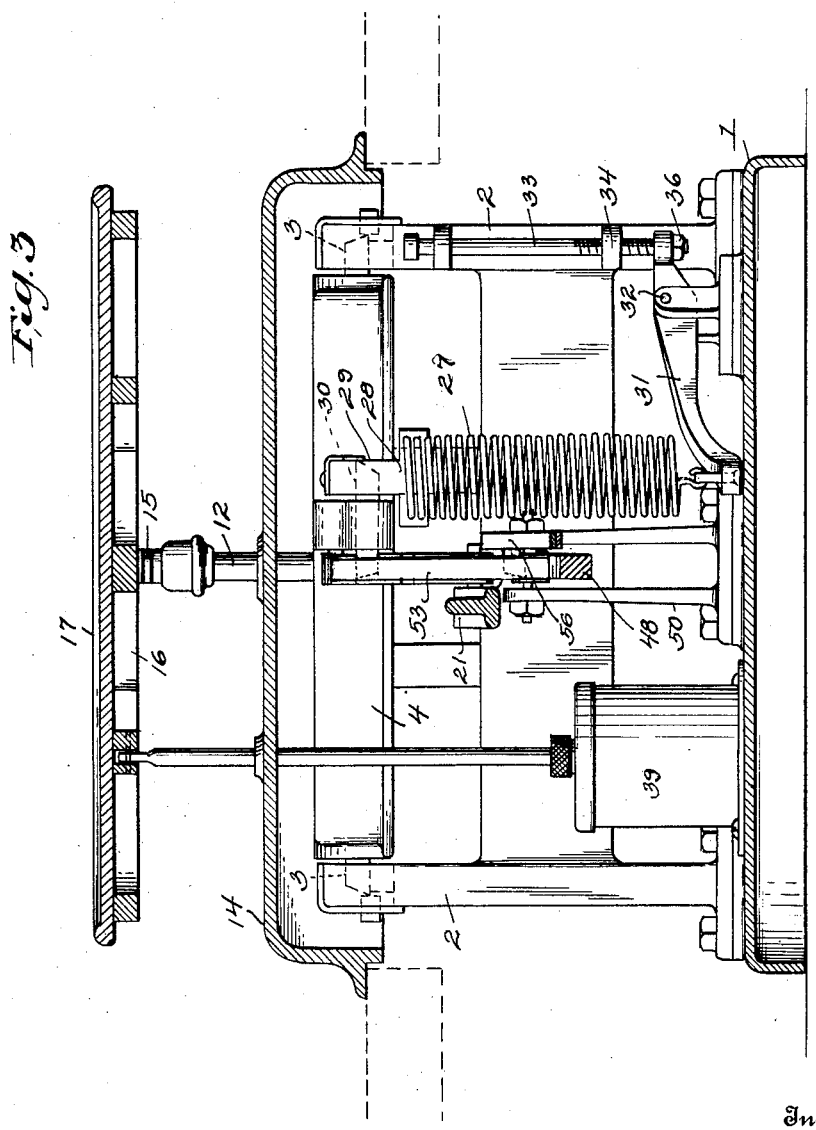

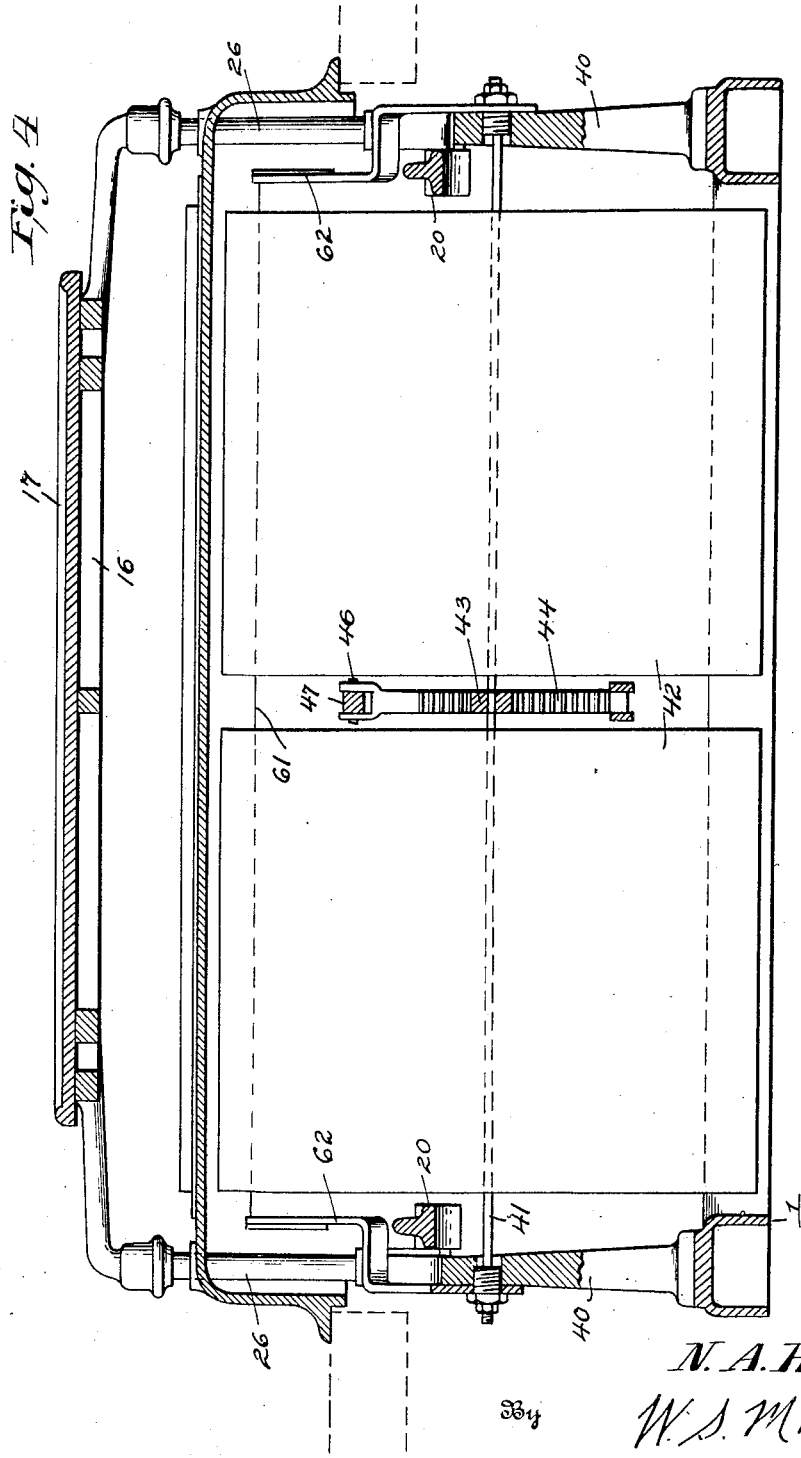

May 5, 1931. N. A. HALLWOOD 1,804,053
SCALE
Filed June 7, 1928 5 Sheets-Sheet 5
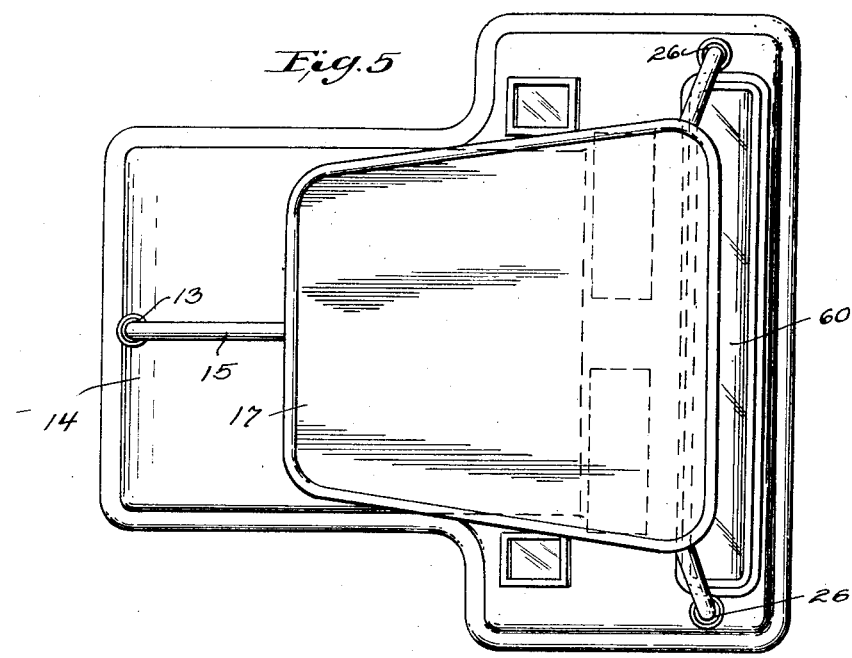
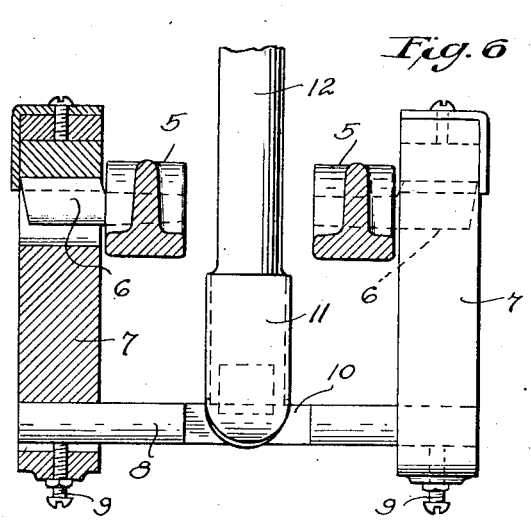
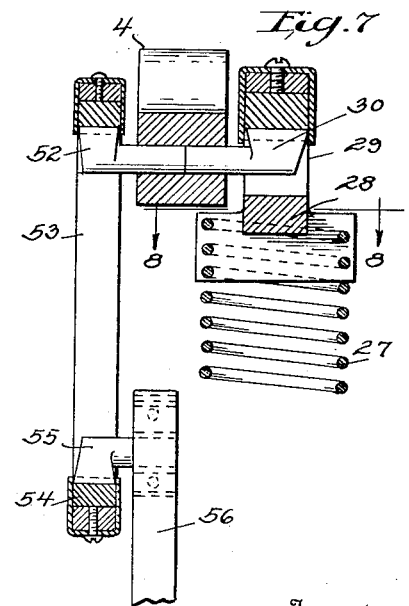
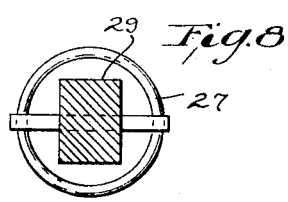
Inventor
N. A. Hallwood
By W. S. McDowell
Attorney Patented May 5, 1931

1,804,053

UNITED STATES PATENT OFFICE

NATHAN A. HALLWOOD, OF COLUMBUS, OHIO

SCALE

Application filed June 7, 1928. Serial No. 283,620.

This invention relates to weighing scales, and has for an outstanding object the provision of a compact, simple and efficient scale adapted for general weighing purposes and one wherein provision is made for supporting the weights or loads applied to the scale by means of a reverse compound beam or lever pivotally carried by the base of the scale and adapted by the operation of a correlated spring or its equivalent to yieldingly resist deflection of the lever or beam from a normal operating position.

One of the main objects of this invention is to provide a reverse compound lever action which provides a condition in a weighing machine that has long been desired, namely, a compact unit having a satisfactory spring length and which is yet not too long to increase the width of the weighing platform from the counter or other form of support which carries the scale.

Another important feature of this invention is to provide through the reverse compound lever, a platform large enough to receive the commodities to be weighed and yet to permit of the support of the platform from the compound lever by means of a three point bearing which bearing serves to securely seat the platform on the lever construction and prevents the raising of the platform from its bearings due to the shifting of the load on the load platter, weight receiver or platform.

Another object of the invention is to provide means for transmitting the motion of the lever to an indicating mechanism through a thermostatic element, which operates to maintain the accuracy of the scale through a wide range of temperature fluctuations.

A further object of the invention is to provide a lever means which balances the dead load from the weighing spring or its equivalent.

A still further object of the invention is to provide a reverse lever system which may be used in connection with either spring or pendulum means for maintaining the parts of the scale in a neutral position and yieldingly resist the fluctuation of the scale parts from such normal or neutral position in response to applied weights or loads.

With these and other objects in view which will appear as the description proceeds, the invention consists in the novel features of construction, combination of elements and arrangement of parts hereinafter fully described and pointed out in the appended claims.

Figure 1:
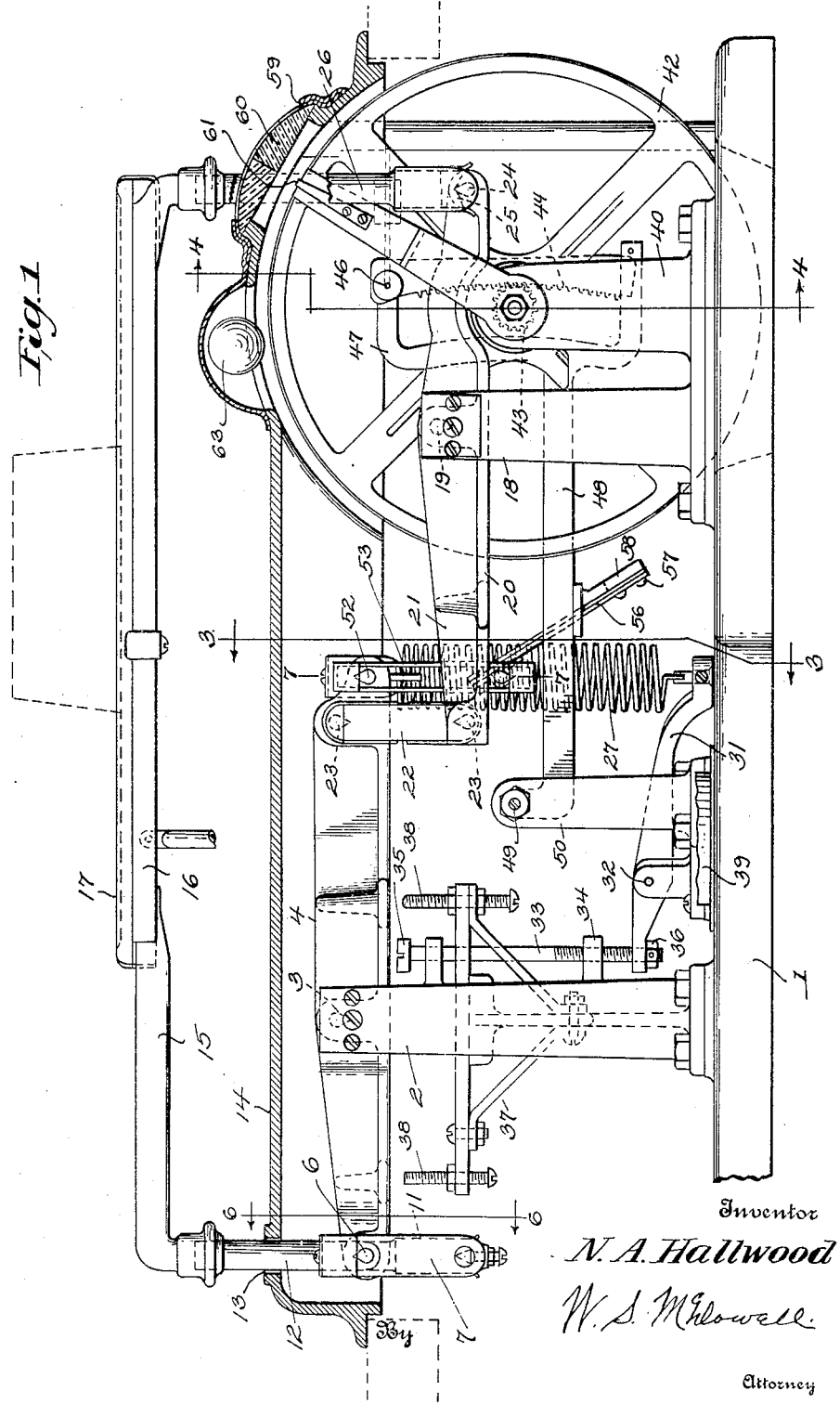
Figure 2:
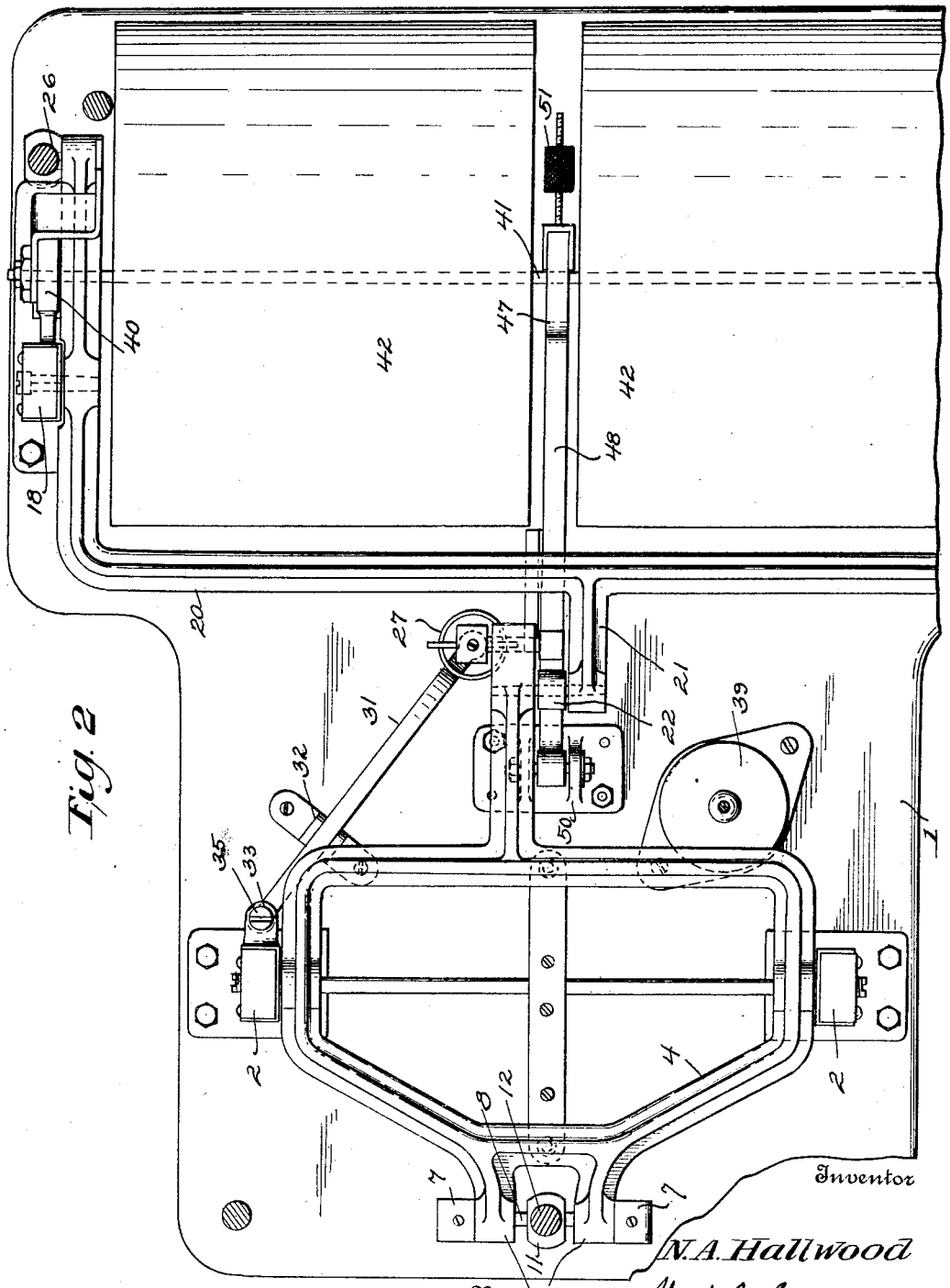

In the accompanying drawings:

Figure 1 is a vertical longitudinal sectional view taken through a scale constructed in accordance with the present invention, Figure 2 is a plan view of the base of the scale with the weight receiver and casing removed, showing more fully the construction of the compound beam and the indicating mechanism, Figure 3 is a vertical transverse sectional view taken on the plane indicated by the line 3—3 of Figure 1, Figure 4 is a similar view on the plane indicated by the line 4—4 of Figure 1, Figure 5 is a top plan view of the scale, showing the weight receiver and scale housing, Figure 6 is a detailed vertical sectional view taken on the plane indicated by line 6—6 of Figure 1, Figure 7 is a similar view on the line 7—7 of Figure 1, Figure 8 is a transverse sectional view on the line 8—8 of Figure 7.

Referring more particularly to the drawings, and to the specific embodiment of the invention therein illustrated, which, it will be borne in mind, is but one of the several possible embodiments of the invention, the numeral 1 designates the base of the scale upon which is mounted the various operating parts to be hereinafter described. Mounted upon the base 1, adjacent to one end thereof, is a pair of brackets 2—2. These brackets are transversely spaced with respect to each other and are located adjacent to the opposed longitudinal sides of the base. The upper ends of the brackets are provided with bearing blocks in which are received the knife edge trunnions 3 which project rigidly and horizontally from the intermediate portion of a horizontal beam unit 4.

The outer end of this beam unit includes a pair of yoke shaped arms 5 which carry horizontally and outwardly extending knife edges 6 which serve to effect the trunnioned support of a pair of depending links 7, the lower ends of the latter being provided with openings adapted for the reception of a transversely extending rod 8, which is secured within said openings by means of set screws or their equivalents 9. Mid-way between the links 7, the rod 8 is provided with a knife edge portion 10, upon which rests a stirrup 11 provided at the lower end of a rod 12. This rod extends upwardly from an opening 13 formed in the top of a scale housing or casing 14, and the upper end of the rod 12 terminates in an inwardly horizontally extending arm 15, which, at its inner end, is connected with the frame 16 of a weight receiver 17.

The weight receiver is located in a horizontal plane from the housing or casing 14 and in vertically spaced relationship with respect to said housing or casing, so that the weight receiver may be moved toward the housing in response to applied weights.

Also mounted upon the base 1 and spaced longitudinally from the brackets 2—2, is a second pair of brackets 18—18. These brackets have their upper ends provided with bearing blocks adapted for the reception of rigid horizontally extending knife edge trunnions 19 which project horizontally from a second beam unit 20 which forms a complemental part of the beam mechanism as a whole. The beam unit 20, as shown in Figure 2, is substantially of U shaped formation when viewed in plan, and an intermediate part of the unit 20 terminates in a forwardly and longitudinally projected arm 21 arranged substantially in the longitudinal center of the scale, the arm 21 being disposed below the registering complemental portion of the upper unit 4. The complemental portions of the beam units 4 and 20 are united by a strap link 22, which has its opposite ends formed to include bearing adapted for the reception of knife edge trunnions 23 carried by and projecting from the complemental portions of the beam units 4 and 20. It will be seen that by the provision of the strap link 22 the beam units 4 and 20 will be connected for synchronous movement and that by virtue of the knife edge trunnions 23 this movement will be effected without undue friction. The beam units oscillate through limited arcs of travel and irrespective of the longitudinal spacing of the pivotal axes of said units, the strap construction 22 functions to maintain the connecting relationship between the adjoining end portions of said units.

The outer ends of the lower beam unit 20 are provided with upturning knife edges 24, upon which rest bearing blocks 25 rigidly retained within the lower portions of a pair of vertically extending rods 26. These rods, corresponding to the single rod 12, extend upwardly through openings provided in the housing 14 and have their upper ends connected with the frame 16 of the weight receiver 17 and of the edge portions of said weight receiver the farthest removed from the arm 15, as disclosed in Figure 5. Thus, the weight receiver is supported for floating movement on the beam structure at three positions with the result that weights applied to the receiver 17 may be located at any point over the full area of said receiver without disturbing the accuracy of the scale.

The movement of the compound beam is yieldingly resistant by means of a coil spring 27. This spring has its upper end secured to a collar 28 which includes an upstanding stem 29. This stem is provided with an opening in which is arranged a bearing block adapted for the reception of a knife edge trunnion 30 which projects horizontally and laterally from the inner end of the beam unit 4. It will be seen that the trunnion 30 serves as a pivotal mounting for the collar and stem 28 and 29 respectively. The lower end of the coil spring 27 is connected with one end of an arm 31. The intermediate portion of this arm or lever is pivotally mounted as at 32 upon the base 1. The other end of the arm or lever 31 is provided with an opening in which is loosely received the lower threaded end of a vertically extending screw 33. This screw is rotatably received within threaded ears 34 which project from one of the brackets 2—2. The upper end of the screw 33 is provided with an enlarged head 35. By rotating the screw 33 it will be seen that the nut 36 rigidly carried by the lower end thereof will be raised or lowered, and since the action of the spring 27 is to maintain the outer end of the lever 31 in engagement with the nut 36, it follows that by raising and lowering the nut 36 the tension of the spring may be correspondingly regulated.

Supported between the brackets 2—2 is a longitudinal horizontally extending frame 37. The outer end of this frame at points spaced from the trunnions 3 equidistantly carries vertically adjustable set screws 38 which normally are maintained in spaced relationship from the beam unit 4. These set screws serve to control the extent of oscillation of the compound beam mechanism and prevent overloading of the spring 27. Also, as shown in Figure 2, the beam unit 4 is adapted to be connected, as usual, with a dash-pot 39 for stabilizing the oscillations of the beam mechanism upon the application of weights thereto.

Maintained upon the outer end of the base 1, immediately adjacent to the brackets 18—18 is a third set of brackets 40—40. These brackets provide journals for the reception of a transversely extending shaft 41, which shaft carries a weight indicating drum 42, the latter in this instance consisting of longitudinally spaced sections mounted for rotation with the shaft 41 and arranged within the confines of the housing or casing 14. It will be observed that the beam unit 20 when viewed in plan is of yoke shaped formation. This is done in order that said beam may oscillate through its required positions of travel and yet to permit of the compact associations of the indicating drum therewith. This is done in order to have an accurately operating scale and yet at the same time to economize in the dimensions of the scale and the space required for effecting its operation. The drum proper may be of any desired construction, usually consisting of a light sheet metal frame around which is arranged a paper cylinder carrying suitable weight and price data.

Between the sections of the drum there is arranged on the shaft 41 a toothed pinion 43, with which engages a pivoted rack 44. This rack has its upper end pivotally mounted as at 46 upon a yoke 47 which is carried by the outer end of an arm 48. The inner end of this arm is pivotally mounted as at 49 on a bracket 50 fastened in and connected with the base 1. A small counter balancing weight 51 is associated with the rack 44 so as to maintain proper engagement at all times between the teeth of the rack and the pinion 43.

To oscillate the arm 48 in proportion to the movement of the compound beam the inner end of the beam unit 4 is provided with a knife edge bearing 52, from which is pivotally suspended a yoke 53, the lower end of which carries a bearng 54 in which is positioned a knife edge stud 55 carried by the upper end of a pair of resilient thermostatic strips 56, the lower end of the strips 56 being rigidly connected as at 57 with a bracket 58 carried in conjunction with the arm 48. It will be seen that when weight is applied to the receiver 17 the beam unit 4 will have its inner end oscillated in an upward direction against the resistance offered to such movement by the coil spring 27. This upward movement of the inner end of the beam unit moves the yoke 53 which in turn through the thermostatic strips 56 oscillates the arm 48, and since the outer end of this arm carries the rack 44 it follows that the shaft 41 and its drum 42 will be rotated so that the weight of the object on the receiver 17 may be determined.

The housing 14 at a position over the drum 42 is provided with a longitudinally extending side opening 59, which is covered by a reading glass or lens 60. Stretched longitudinally across the zero position of the drum is a fine reading wire or norm 61, the ends of which being carried by adjustable arms 62, are mounted in connection with the brackets 40 around the ends of the shaft 41. Normally, the wire 61 occupies a position immediately over the zero reading of the drum, and whereby when the latter is rotated through the mechanism above described, the drum may be read by comparing the positions of the wire or norm 61 with respect to the indicia then visible on the drum through the lens 60. If desired, there may be arranged in the housing 14, close to the lens 60, an incandescent lamp or other source of light 63. This lamp is located in an electrical circuit which is normally open when the scale is unweighted and closed when weights are applied to the receiver 17. This serves to illuminate the drum and permit the same to be read with accuracy and convenience.

In view of the foregoing, it will be seen that the present invention provides a scale of efficient, simple and compact design, which may be readily set to register accurately weights of bodies or materials placed thereon. By locating the indicating drum in the base of the scale or in a plane below the weight receiver, a more compact unit is provided and at the same time convenience is had in the proper reading of the indicating mechanism of the scale. It will be understood that the housing or casing 14 may either completely or partially surround the operating parts of the scale which are mounted on the base 1. This depends largely on the manner of mounting the scale for use. For example, as shown in Figure 1, the housing rests directly on the counter in which is formed an opening for the reception of the scale proper or, if desired, the housing may be extended, so as to completely cover the operating parts of the scale. The thermostatic link 56 not only serves to transmit the motion of the compound beam to the operating arm 48 of the indicating mechanism, but in addition automatically corrects the scale in accordance with temperature conditions. For example, at relatively low temperatures the strips 56 contract, thereby partially elevating the arm 48 and securing the corresponding adjustment in the operating mechanism and indicating mechanism. Conversely, if the temperatures are higher than normal, the strips 56 expand, rocking the arm 48 in the opposite direction producing corresponding corrections in the working positions of the indicating mechanisms.

The construction provides, it will be noted, a compound lever wherein the lever elements occupy reverse positions producing an action which provides a compact scale unit wherein a set spring length is present and which is not too long to increase the height of the weighing platform from the counter. Again, through the provision of the reverse compound lever the scale provides a platform large enough to receive the commodities to be weighed on a three point self-adapting bearing, eliminating for all practical purposes the possibility of raising the bearing from the lever construction when the load is shifted or wrongly placed on the load platter. That is to say the load may be situated at any position on the platter and yet the weight thereof will be distributed upon the three bearings of the lever mechanism, thereby producing a scale which operates uniformly throughout all positions of weight application. Another outstanding feature is the thermostatic link connection between the lever mechanism and the indicating mechanism for compensating for changes in temperature and to cause the indicating mechanism to normally assume a zero position irrespective of temperature fluctuations. The invention still further provides a lever means so constructed as to balance the dead load from the weighing spring.

I have described what I consider to be the preferred form of the invention, nevertheless, it will be understood that various changes may be made from the disclosure herein specifically set forth without departing from the scope of the invention as the latter has been set forth in the following claims.

What is claimed is:

1. In a scale, a base, a reverse compound beam mounted pivotally on said base, a weight receiver carried by said beam, an indicating drum rotatably mounted in connection with said base, a pivoted arm carried by said base, means formed with the outer end of said arm for rotating said indicating drum, a thermostatic element carried by said arm, and a yoke pivotally connecting said thermostatic element with said beam, said thermostatic element upon atmospheric changes serving to shift its pivotal connection with said yoke to points nearer and further away from the pivotal connection of said arm to said base.

2. In a scale, a base, a beam pivotally mounted on said base, a weight receiver carried by said beam, an indicating drum rotatably mounted in connection with said base, an arm having one end pivoted and carried by said base and the other end formed with means for rotating said drum, a flexible thermostatic element having one end rigidly connected with said arm, and a connection between the other end of said element and said beam, said element being positioned in a vertical plane and at an angle towards the pivotal end of said arm.

3. In a scale, a base, a beam mounted pivotally on said base, a weight receiver carried by said beam, an indicating drum rotatably mounted in connection with said base, an arm pivoted at one end to said base, means formed at the other end of said arm for rotating said indicating drum, a yoke depending from said beam, and a thermostatic member carried by said arm and having one end thereof rigidly connected to said arm and the other end pivotally connected to said yoke, said yoke and thermostatic member being positioned angularly with respect to each other.

4. In a scale, a base, a beam mounted pivotally on said base, a weight receiver carried by said beam, an indicating drum rotatably mounted in connection with said base, an arm pivoted at one end to said base, means formed at the other end of said arm for rotating said indicating drum, a depending yoke carried by said beam, a knife edge bearing connection between the upper end of said yoke and said beam, a thermostatic member carried by said arm and having one end thereof rigidly connected to said arm and the other end connected to a knife edge bearing formed with the lower end of said yoke, said yoke and thermostatic member being positioned angularly with respect to each other, which angularity is varied by said thermostatic element upon atmospheric changes.

5. In a scale, a base, a beam mounted pivotally on said base, a weight receiver carried by said beam, an indicating drum rotatably mounted in connection with said base, a pivoted arm carried by said base, means formed at the other end of said arm for rotating said indicating drum, a thermostatic element carried by said arm comprising a strip positioned angularly with respect to said arm, and a yoke carried by said beam and connecting one end of said strip, whereby said strip upon atmospheric changes will bend and its effective length become shortened and cause its connecting end with said yoke to move towards the pivotal connection of said arm, whereby the zero error is of the scale thus corrected by the shortening of the effective length of said strip and the capacity error is also corrected in said scale by the changes in position of the connection between said strip and yoke with respect to the pivotal connection of said arm.

6. In a scale, a base, a beam mounted pivotally on said base, a weight receiver carried by said beam, an indicating drum rotatably mounted in connection with said base, an arm pivoted at one end to said base, means formed at the other end of said arm for rotating said indicating drum, a connection between said arm and said beam, and a thermostatic element forming a part of said connection and serving to rectify errors of the weighing mechanism caused by temperature changes.

7. In a scale, a base, a beam mounted pivotally on said base, a weight receiver carried by said beam, an indicating drum rotatably mounted in connection with said base, a pivoted operating device for said drum, a yoke connection between said beam and said operating device, and a thermostatic element positioned between the beam and said operating device and having one end thereof connected to one end of said yoke, said thermostatic element serving to rectify errors of the weighing mechanism caused by temperature variations.

8. In a scale, a base, a beam mounted pivotally on said base, a weight receiver carried by said beam, a weight indicator, a pivoted operating device for said indicator, a thermostatic element comprising a strip positioned between said beam and said operating device serving to rectify errors of the weighing mechanism caused by temperature variation, said strip being positioned at an angle with respect to said beam and operating device.

9. In a scale, a base, a reverse compound beam mounted pivotally on said base, a weight receiver carried by said beam, an indicating drum rotatably mounted in connection with said base, a pivoted arm carried by said base, a rack formed in connection with the outer end of said arm for rotating said indicating drum, and a thermostatic connection between said beam and said arm whereby said arm is oscillated upon the movement of said beam from a predetermined normal position.

10. In a scale, a base, a reverse compound beam mechanism pivotally mounted upon said base, a weight receiver pivotally supported in connection with said beam mechanism, spring means connected with said beam mechanism and serving to maintain the latter in a predetermined normal position, a weight indicator, a pivoted operating device for said indicator, and thermostatic connections between said beam mechanism and said operating device.

11. In a scale, a base, a pair of lever elements pivotally mounted intermediately of their ends upon said base, a link connection between the adjoining lever ends of said lever elements being formed to include a yoke shaped outer end, resistance means tending to maintain said lever elements in a neutral position, a weight receiver, a pair of spaced stems depending from one end of said weight receiver and resting upon bearings carried by the yoke shaped end of said lever element, and a single stem depending from the other end of said weight receiver and arranged in a plane intermediately of the planes of said other stems.

In testimony whereof I affix my signature.

NATHAN A. HALLWOOD.